US006988915B2

(12) United States Patent
Hirose

(10) Patent No.: US 6,988,915 B2
(45) Date of Patent: Jan. 24, 2006

(54) TERMINAL STRUCTURE OF DIRECT ELECTRIC CURRENT MULTILAYER STRUCTURE SUPERCONDUCTING CABLE AND DC SUPERCONDUCTING CABLE LINE

(75) Inventor: Masayuki Hirose, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/782,795

(22) Filed: Feb. 23, 2004

(65) Prior Publication Data

US 2004/0171308 A1 Sep. 2, 2004

(30) Foreign Application Priority Data

Feb. 28, 2003 (JP) ............................. 2003-054375

(51) Int. Cl.
    *H01R 24/04* (2006.01)
    *H01R 4/66* (2006.01)
    *H01R 13/648* (2006.01)

(52) U.S. Cl. ...................................... 439/668; 439/108

(58) Field of Classification Search ................ 439/668, 439/669, 670, 108, 188, 579, 578, 580; 174/125.1
See application file for complete search history.

(56) References Cited

U.S. PATENT DOCUMENTS

| 4,165,147 | A | * | 8/1979 | Buck | .......................... 439/188 |
|---|---|---|---|---|---|
| 4,390,224 | A | * | 6/1983 | Showman et al. | .......... 439/264 |
| 5,409,403 | A | * | 4/1995 | Falossi et al. | .............. 439/668 |
| 6,394,852 | B1 | * | 5/2002 | Huang | ........................ 439/669 |
| 6,572,402 | B2 | * | 6/2003 | Lin | ............................ 439/490 |
| 6,828,507 | B1 | * | 12/2004 | Fritzemeier et al. | ..... 174/125.1 |
| 6,844,490 | B2 | * | 1/2005 | Nassi et al. | ................ 174/15.5 |
| 6,867,375 | B2 | * | 3/2005 | Hughey et al. | .......... 174/125.1 |

FOREIGN PATENT DOCUMENTS

| GB | 2 350 495 | 11/2000 |
|---|---|---|
| JP | 10126917 | 10/1996 |
| JP | 10233246 | 2/1997 |
| JP | 11086923 | 9/1997 |
| JP | 10-228933 | 8/1998 |
| JP | 2001006837 | 6/1999 |
| JP | 20010006453 | 6/1999 |
| JP | 2003141946 | 11/2001 |

* cited by examiner

*Primary Examiner*—Chandrika Prasad
(74) *Attorney, Agent, or Firm*—Foley & Lardner LLP

(57) ABSTRACT

The present invention discloses a direct electric current superconducting cable having a core and a plurality of superconducting layers provided over the core with end portions of the superconducting layers exposed in a step-by-step manner from an outer layer to an inner layer and connected individually to outgoing conductors. The superconducting layers are insulated from each other. An insulating fixing member is used to support the core and the outgoing conductors. An electrical insulation layer, a return-current conductor layer and an insulating protective layer in that order surrounds the outermost superconducting layer.

9 Claims, 3 Drawing Sheets

US 6,988,915 B2

TERMINAL STRUCTURE OF DIRECT ELECTRIC CURRENT MULTILAYER STRUCTURE SUPERCONDUCTING CABLE AND DC SUPERCONDUCTING CABLE LINE

BACKGROUND OF THE INVENTION

1. Field of the Invention

The present invention relates to the terminal structure of a direct electric current (DC) superconducting cable and to a DC superconducting cable line.

2. Description of the Related Art

The superconductor of a superconducting cable is generally constituted by a superconducting layer which is formed by spirally winding superconducting wires around a core material (hereinafter called a "former"). When the superconducting cable is used as a direct electric current cable, soldering is generally performed for connecting superconductors together or connecting the end of a superconductor with a wire consisting of a normal conductor (for example, refer to Japanese Patent Application Publication No. 10-228933). Some of superconducting cables have a multi-layer structure superconductor consisting of a plurality of superconducting layers (for example, see FIG. 3 of Japanese Patent Application Publication No. 10-228933). In this case, as shown in FIG. 3 of the 10-228933 gazette, soldering is done simultaneously such that the ends of all superconducting layers conduct to each other.

In a DC power transmission and distribution system which is constituted by a plurality of power supplies and loads, a plurality of cables are connected to the respective power supplies so as to form a plurality of circuits, which results in increase in the number of cables to be used. In this case, it is possible to increase the amount of electric current and to decrease loss by using superconducting cables. However, a number of cables must be used according to the number of the power supplies, and the space for arranging the cable distribution line is necessary.

SUMMARY OF THE INVENTION

An object of the present invention is to provide a terminal structure of a direct electric current superconducting cable and a direct electric current superconducting cable line, in which a single superconducting cable is made possible to transmit electric power of a plurality of circuits so that the transmission of increased electric current, the minimization of needed space, and the decrease of transmission loss can be achieved.

In order to achieve the above object, the direct electric current superconducting cable of the present invention has a core material (i.e., former), a plurality of superconducting layers, and outgoing conductors made of a normal conductor material, wherein the superconducting layers are provided around the former in a manner such that the end portions of the superconducting layers are exposed step-by-step from an outer layer to an inner layer, and the outgoing conductors are individually connected with the respective stepwise exposed portions of the superconducting layers.

The outgoing conductors may be connected individually with the exposed end of each layer of the superconducting layers in a manner such that the outgoing conductors are extended in a direction perpendicular to the axial direction of the superconducting cable. One end of the outgoing conductors may be connected with the exposed end of the superconducting layer such that the outgoing conductors are extended therefrom along the axial direction of the superconducting cable.

Moreover, an insulating fixing member may be provided so that the core material and the outgoing conductors are held integrally. A return-current conductor layer made of superconducting material may be provided outside the electrical insulation layer, and an insulating protective layer may be provided thereon.

Thus, using the direct current superconducting cable terminal structure of present invention, a direct electric current superconducting cable line, which has power supplies, loads and a superconducting cable for supplying electric power from the power supplies to the loads, can be formed.

In such case, it is preferable that at least one end of the superconducting cable have any of the terminal structures described above such that each outgoing conductor is connected to each power supply or load.

Moreover, the above-mentioned direct electric current superconducting cable line of present invention may be equipped with a cutoff mechanism for cutting-off the grounded superconducting layer from the corresponding power supply and load when any superconducting layer of the superconducting cable is grounded.

Also, layer-insulations provided in the superconducting cable may be afforded with the dielectric strength that enables the voltage of other superconducting layers to be maintained when any layer of the superconducting multiple layers is grounded.

DESCRIPTION OF THE PREFERRED EMBODIMENTS

Hereinafter, a detailed explanation of the present invention is given.

Figure 1:
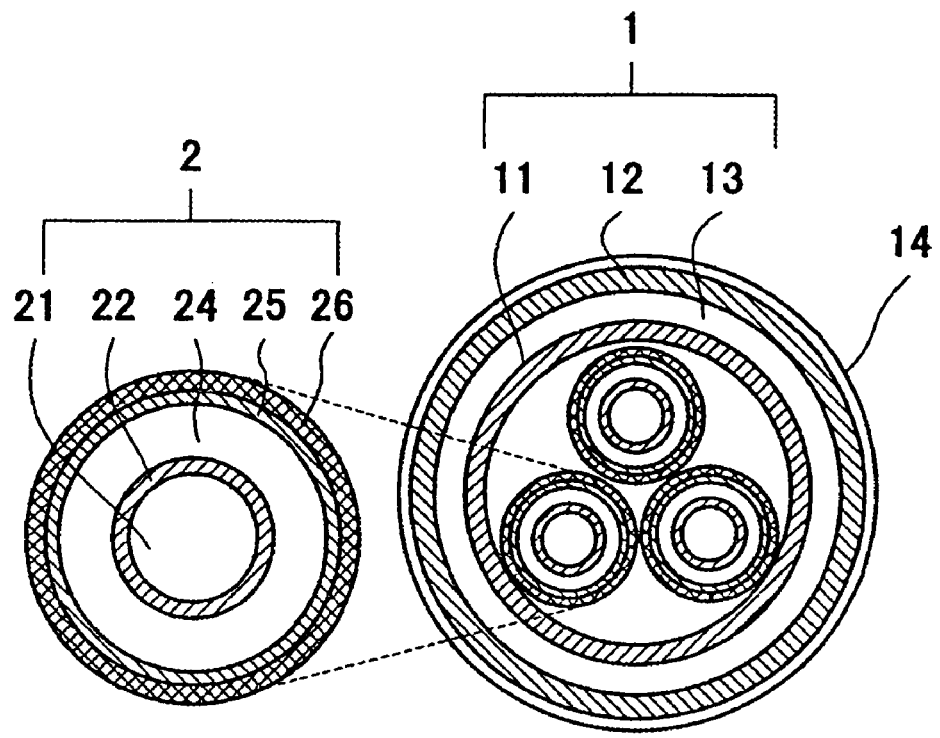
FIG. 1 is a sectional view of a superconducting cable according to the present invention.
Figure 2:
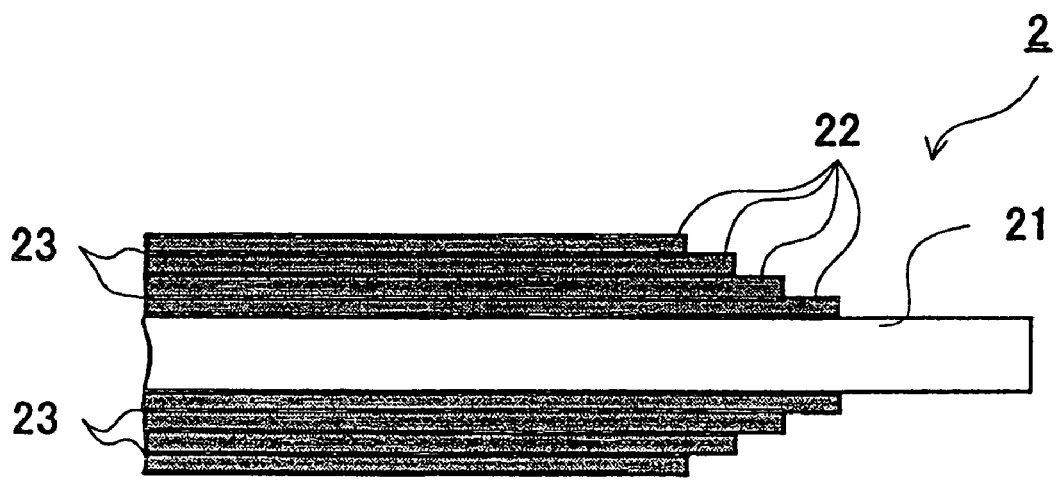
FIG. 2 is a sectional view showing the structure of a former and a superconducting layer in the terminal portion of the cable core of a superconducting cable according to the present invention.
Figure 3:
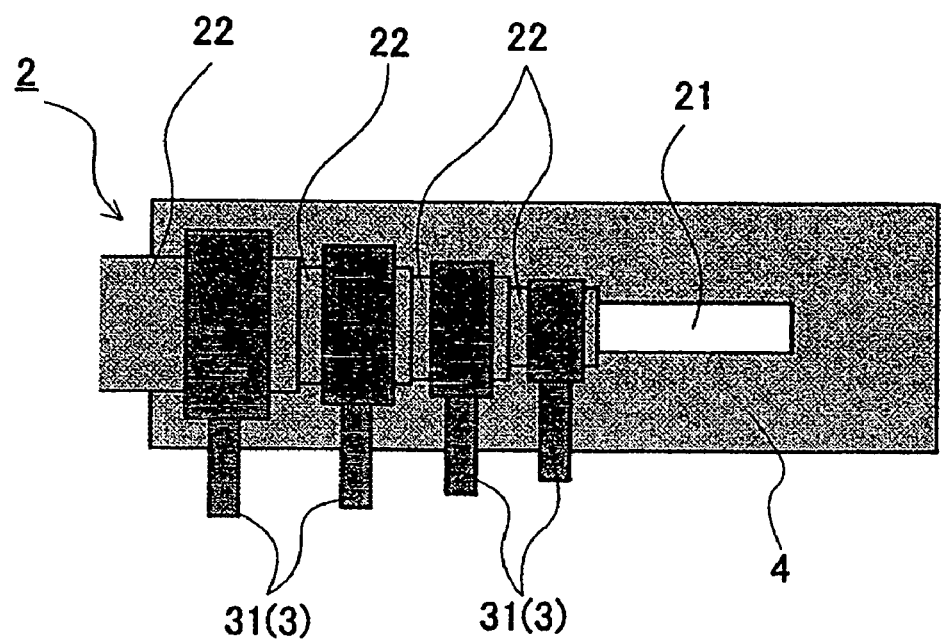
FIG. 3 is a schematic diagram showing a terminal structure of a superconducting cable according to a first embodiment of the present invention.
Figure 4:
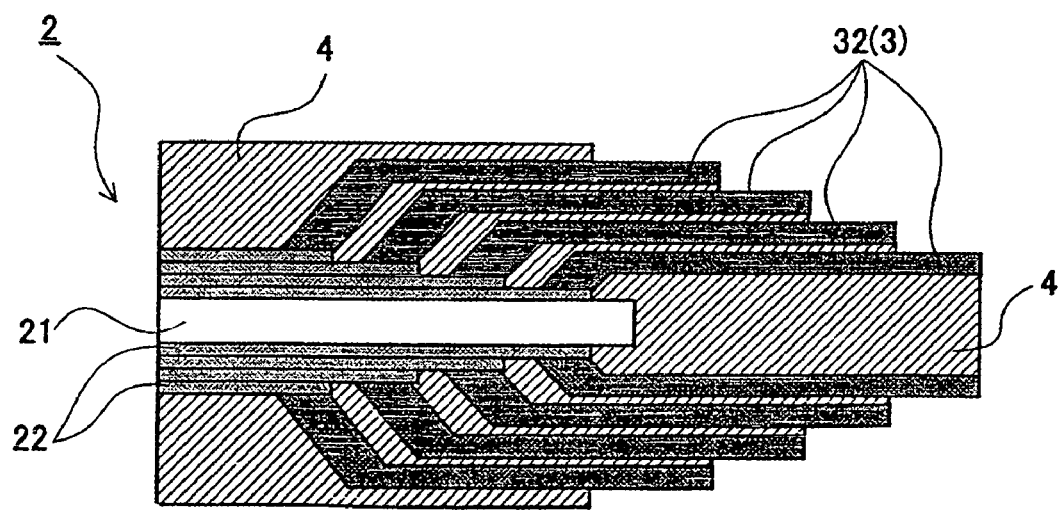
FIG. 4 is a schematic diagram showing a terminal structure of a superconducting cable according to a second embodiment of the present invention.
Figure 5:
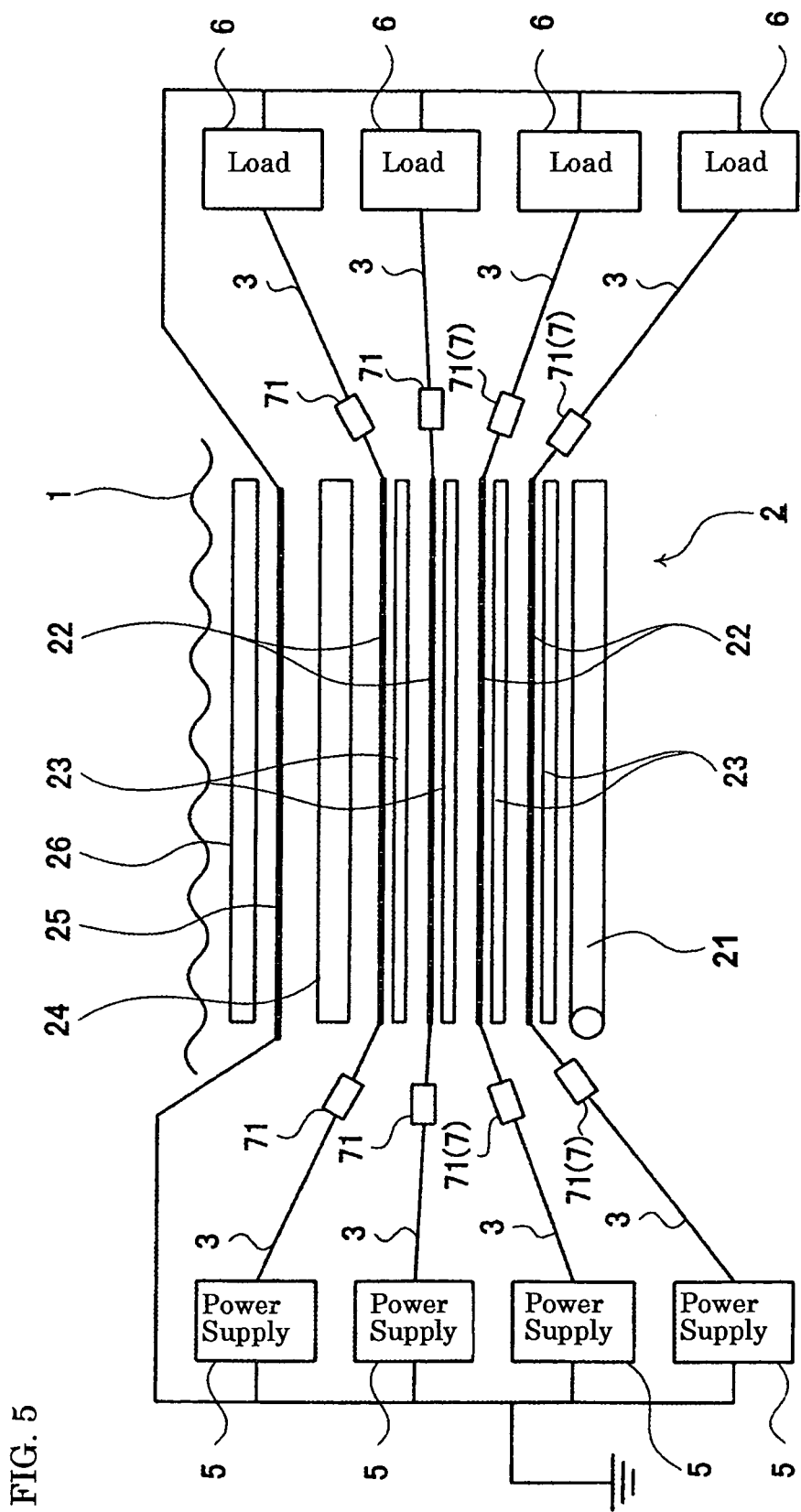
FIG. 5 is a schematic diagram showing a cable line which adopts the terminal structure of a superconducting cable according to the present invention.

In the drawings, the same mark is put to the identical elements and their explanation will not be repeated. The ratio of sizes in the drawings may not always agree with the description in the specification. FIG. 1 is a sectional view of a superconducting cable according to the present invention, and FIG. 2 shows the terminal structure of conductor part in a cable core of the superconducting cable. FIG. 3 and FIG. 4 schematically illustrate the terminal structure of the conductor part of the superconducting cable core to which the outgoing conductors are connected. FIG. 5 is a schematic diagram showing the structure of a cable line using a superconducting cable, and in the figure the illustration is given with respect to the structure of a cable core.

[The Whole Structure of a Superconducting Cable]

A superconducting cable may have a single core or three stranded cores. The superconducting cable is housed in a thermal insulation pipe in which a coolant is to be filled so as to obtain cryogenic temperature. The thermal insulation pipe preferably has a double pipe structure consisting of a corrugated inner pipe and outer pipe, each made of stainless steel, for example, and the space between these inner and outer pipes is kept in vacuum condition.

FIG. 1 is a superconducting cable according to one embodiment of the present invention, in which three stranded cable cores 2 are housed inside a thermal insulation pipe 1.

[Thermal Insulation Pipe]

The thermal insulation pipe 1 has a double-pipe structure consisting of an inner pipe 11 and outer pipe 12, and a thermal insulating layer 13 is formed between the inner pipe 11 and the outer pipe 12. A so-called super insulation, which consists of a stack of laminated plastic reticulate body and metallic foil, is arranged in the thermal insulating layer 13. A coolant such as liquid-nitrogen is filled inside the inner pipe 11. An anticorrosion layer 14 made of polyvinyl chloride or the like may be provided, according to need, around the outer periphery of the thermal insulation pipe 1.

[Cable Core]

Each of the cable cores 2, which are to be housed in the thermal insulation pipe 1, is provided with, in the enumerated order from the center as shown in FIG. 1 and FIG. 5, a former 21 which is to function as a core material, a superconducting layer 22 which is to function as a superconductor, a layer insulation 23 (shown in FIG. 5), an electrical insulation layer 24, a return-current conductor layer 25, and an insulating protective layer 26 having both functions of insulation and mechanical protection.

<Former>

The former 21 may be a solid made of stranded metal wires or a hollow body made of a metallic pipe. In the case of a hollow former, the inside thereof can also be used as a path for a coolant. A solid former is made of stranded copper wires, for example. The copper wires need not be provided with an insulation covering because the superconducting cable of the present invention is used for direct current.

<Superconducting Layer>

The superconducting layer 22 is preferably made of tapes consisting of oxide high Tc superconductor, such as a Bi-based superconductor, which is covered with a silver sheath. These tapes constitute a conductor by being wound around the former 21 in multiple layers.

<Layer Insulation>

A layer insulation 23 in the superconducting cable is provided by winding a kraft paper around each superconducting layer 22 so that each layer of the multiple superconducting layers 22 can be independent of other superconducting layers 22. The thickness of the layer insulation 23 is designed to be sufficiently thick to have the dielectric strength that enables the voltage of the other superconducting layers can be maintained when any superconducting layer is grounded partially. Thus, a large electric current flowing through such grounded superconducting layer can be cut off so that it may not influence on the power transmission of other superconducting layers.

<Electrical Insulation Layer>

It is preferable to provide a superconducting cable with an electrical insulation layer such that the outer side of the outermost superconducting layer is covered with the electrical insulation layer. The electrical insulation layer 24 is formed by winding a compound tape consisting of a laminated plastic film (e.g., polypropylene) and kraft paper, for example, around the outer periphery of the outermost superconducting layer 22.

<Return-Current Conductor Layer>

The return-current conductor layer 25 is formed by winding superconducting tapes around the outer side of the electrical insulation layer 24. This return-current conductor layer 25 allows an electric current to flow in the direction opposite the direction of the electric current flowing through the superconducting layer 22 in a cable line described later so that a magnetic field may not let out to the outside of the cable. Moreover, the insulating protective layer 26, which also functions as protection, is provided around the outer side of the return-current conductor layer 25.

[Cable Terminal Structure]

Hereinafter, an explanation is given about a cable terminal structure in the case of 4 superconducting layers 22. FIG. 2 shows only a former 21 and superconducting layers 22 at the end portion of cable core 2. The end of each superconducting layer 22 is individually connected, at the terminal portion of the cable, with a corresponding outgoing conductor 3 which is composed of a normal conductive material.

<Terminal Structure of the Cable Core>

The former 21 protrudes from the end of the superconducting layers 22. The superconducting layers 22 are structured such that the end portion thereof is exposed step-by-step from an inner layer to an outer layer. More specifically, at the end portion of the cable, the electrical insulation layer 24 formed on the outermost superconducting layer 22, the return-current conductor layer 25, and the insulating protective layer 26 are removed at a given length, respectively.

Thus, at the exposed portion of the outermost superconducting layer 22 about which the electrical insulation layer 24 is removed, the outermost superconducting layer 22 and the layer insulation 23 directly under it are removed such that the superconducting layer 22 immediately thereunder is exposed protruding at a given length from the end faces of the electrical insulation layer 24 and other members which have partly been removed.

Subsequently, at the exposed portion of the next superconducting layer (i.e., the second superconducting layer adjacent to the outermost layer which has partly been removed), the above-mentioned next superconducting layer and the layer insulation immediately thereunder are removed partially such that the superconducting layer adjacently thereunder is exposed at a given length from the end face of such partly removed outermost superconducting layer. In this manner, the end portion of each superconducting layer is exposed stepwise at given length by repeating the process to remove the end portions of a superconducting layer and the layer insulation directly under it in the order from an outer layer to an inner layer to the innermost superconducting layer (i.e., the fourth superconducting layer).

<Structure of the Outgoing Conductors>

The structure of outgoing conductors 3 will be described hereunder about first and second embodiments of the present invention as shown in FIG. 3 and FIG. 4, respectively. In each embodiment, the outgoing conductors 3 composed of a normal conductive material such as copper or aluminum are connected by soldering individually with the exposed end of the respective corresponding superconducting layers 22.

In the first embodiment shown in FIG. 3, a plurality of outgoing conductors 31 (3) are formed, and an end of each outgoing conductor 31 is connected individually with the exposed end of a corresponding superconducting layer 22. Then, the other end portion of each outgoing conductor is extended from the exposed portion of the respective superconducting layers 22 at a right angle relative to an axial direction of the superconducting cable. In this case, the respective outgoing conductors 31 are extended in parallel as shown in FIG. 3.

The outgoing conductors 32 (3) of the second embodiment shown in FIG. 4 are composed of a plurality of outgoing conductors 32 each having a tubular shape (or a tubular shape divided in half circle) of a different dimension. An end of the outgoing conductors 32 are connected with the exposed end portion of the corresponding superconducting layers 22 in a manner such that the tubular bodies are disposed concentrically one over the other. Then, the other end of the outgoing conductors 32 are extended along the axial direction of the cable. The outgoing conductors 32 are connected with the exposed portion of the superconducting layers 22 such that an inner superconducting layer is connected with an outgoing conductor having a smaller diameter step by step in the order of a smaller one to a larger one.

For extending the outgoing conductors along the axial direction of the superconducting cable, an end of the outgoing conductor made of wires instead of a tubular body may be individually connected with the exposed end of each superconducting layer.

Moreover, the end of each outgoing conductor 32 is exposed stepwise so that the outer surface thereof is exposed step by step from an inner one to outer one. Such structure makes it possible to easily connect other conductors with the ends of the outgoing conductors 32.

<Structure for Supporting the Former and Outgoing Conductors>

The former 21 and outgoing conductors 3 are integrally supported by an insulating fixing member 4. The insulating fixing member 4 is made of an insulative resin material and is structured so as to electrically insulate between the outgoing conductors 3, between an outgoing conductor 3 and the other superconducting layers 22 but the superconducting layer 22 with which the outgoing conductor 3 is connected, and between the former 21 and the outgoing conductors 3. The terminal end of the superconducting cable can be fixed by supporting the former 21 and the outgoing conductors 3 with the insulating fixing member 4. In addition, supporting the core material and the outgoing conductors with the insulating fixing member improves the strength of the superconducting cable terminal structure. Preferably, the insulating fixing member has a structure to insulate between the outgoing conductors, and between the outgoing conductors and the superconducting layers with which no outgoing conductors are connected.

[Structure of a Cable Line]

When a plurality of power supplies are arranged on the side of an end of the superconducting cable, each power supply is connected with one of the outgoing conductors which are connected individually with the ends of the respective superconducting layers on that side. Also, when a plurality of loads are arranged on the side of the other end of the superconducting cable, each load is connected with one of the outgoing conductors which are connected individually with the ends of the superconducting layers on that side.

In the case where a plurality of power supplies are arranged on the side of an end of the superconducting cable, and loads, which correspond to the respective power supplies, are arranged on the side of the other end of the superconducting cable, both ends of each superconducting layer are connected individually with the respective outgoing conductors, and a power supply and a corresponding load are connected with one superconducting layer through the outgoing conductors.

For example, in a case where the superconducting cable has a core material, a plurality of superconducting layers, an electrical insulation layer provided outside the outermost superconducting layer, a return-current conductor layer provided outside the electrical insulation layer, and an insulating protective layer, the outgoing conductors, which are connected individually with the ends of the respective superconducting layers, are extended to the outside of a superconducting cable. Then, power supplies are connected individually with the respective outgoing conductors which are connected with the end portion of the superconducting cable. Also, loads are connected individually with the respective outgoing conductors which are connected with the other end portion of the superconducting cable. Then, each power supply and each load are connected through the return-current conductor layer of the superconducting cable.

In this case, it is possible to prevent a magnetic field from leaking out to the outside of the cable because an electric current flows in the return-current conductor layer in the opposite direction relative to the electric current flowing through a superconducting layer. Each power supply and each load share a return-current conductor layer as the ground potential (common potential). In a cable line, all of the voltages may be the same or may be different.

An explanation is given hereunder with reference to FIG. 5 about a superconducting cable according to one embodiment of the present invention. The superconducting cable line shown in FIG. 5 is an example in which one cable core 2 is used.

In the cable line shown in FIG. 5, a plurality of power supplies 5 are arranged on the side of an end of a cable core 2, and loads 6 are arranged on the side of the other end of the cable core such that each load corresponds to one of the power supplies 5. Both ends of each superconducting layer 22 of the cable core 2 are connected individually with outgoing conductors 3, and each outgoing conductor 3 is connected with a power supply 5 or load 6. Thus, one power supply 5 is connected with one corresponding load through one superconducting layer 22 and outgoing conductors 3 connected thereto. The return-current conductor layer is connected through another conductor with all power supplies 5 and all loads 6.

A closed loop circuit is constituted by using a superconducting layer 22 of the cable core 2 and the return-current conductor layer 25. All of the voltage to be used in the closed loop circuits of the present embodiment can be the same or different. In the cable line, cutoff mechanisms 7 are provided so that if a superconducting layer 22 of the cable core 2 is grounded, it can be cut off from the power supply 5 and the load 6. Here, the words "a superconducting layer of the superconducting cable is grounded" mean that a power supply or a load is grounded for an inspection, a failure, or the like.

Preferably, the cutoff mechanisms are provided at both ends of the cable. In such case, the superconducting layer which is grounded can be cut off from the power supply and the load by using the cutoff mechanism. For example, the cutoff mechanism may be constituted such that voltmeters or ammeters are provided at both ends of the superconducting layers, and relays, which operate based on the results of measurement by the voltmeters or the ammeters, are provided. An electric fuse may be provided instead of the relay.

For example, the cutoff mechanisms 7 shown in FIG. 5 are constituted by providing voltmeters (not illustrated) or ammeters (not illustrated) in the outgoing conductors 3 which are connected with either ends of the superconducting layers 22, and by providing relays 71 which operate according to the results of measurement by the voltmeters or the ammeters. The voltmeters measure voltage at both sides of the relays 71. The ammeters measure an electric current at both sides of the relays 71. In the event that a superconducting layer is grounded, the grounded superconducting layer is cut off from the power supply and the load by the cutoff mechanism 7 so that the other superconducting layers are protected.

As described above, it is possible to constitute a plurality of circuits with one cable core by using the terminal structure of the direct electric current superconducting cable of the present invention and the structure of the direct electric current superconducting cable line. Also, the power transmission loss can be reduced because a superconducting cable is used. Therefore, the cost performance is excellent and the required space can be reduced. Moreover, it is possible to prevent a magnetic field from leaking out to the outside of the cable by providing a return-current conductor layer in which an electric current is caused to flow in the opposite direction relative to the electric current flowing through the superconducting layer.

What is claimed is:

1. A terminal structure of a direct electric current superconducting cable comprising:
   a core,
   a plurality of superconducting layers provided over the core,
   outgoing conductors made of a normal conductive material, wherein the end portion of each of the superconducting layers is exposed in a step-by-step manner from an outer layer to an inner layer, and the outgoing conductors are individually connected with the exposed end portions of the respective superconducting layers,
   layer insulations for insulating between the superconducting layers, and
   an insulating fixing member for integrally supporting the core and the outgoing conductors,
   wherein an electrical insulation layer, a return-current conductor layer, and an insulating protective layer are provided in the enumerated order over the outermost superconducting layer.

2. The terminal structure of a direct electric current superconducting cable according to claim 1, wherein the electrical insulating layer is formed of a tape consisting of a laminated plastic film and kraft paper, and wherein the layer insulations are formed of kraft paper.

3. The terminal structure of a direct electric current superconducting cable according to claim 1, wherein the outgoing conductors are extended from the exposed portions of the superconducting layers in a direction along the axial direction of the superconducting cable.

4. The direct electric current superconducting cable comprising power supplies, loads and a superconducting cable for supplying electric power from the power supplies to the loads, wherein at least one end of the superconducting cable has a terminal structure according to claim 1, and each outgoing conductor is connected with one of the power supplies or one of the loads.

5. The direct electric current superconducting cable comprising power supplies, loads and a superconducting cable for supplying electric power from the power supplies to the loads, wherein at least one end of the superconducting cable has a terminal structure according to claim 2, and each outgoing conductor is connected with one of the power supplies or one of the loads.

6. The direct electric current superconducting cable according to claim 4, further comprising a cutoff mechanism for cutting off a superconducting layer of the superconducting cable from the power supply and the load when the superconducting layer is grounded.

7. The direct electric current superconducting cable according to claim 4, wherein the layer insulations have dielectric strength sufficient for maintaining the voltage of the other layers when any one of the superconducting layers is grounded.

8. The direct electric current superconducting cable according to claim 6, wherein layer insulations have dielectric strength sufficient for maintaining the voltage of the other layers when any one of the superconducting layers is grounded.

9. The terminal structure of a direct electric current superconducting cable according to claim 2, wherein the layer insulations do not include any laminated plastic film.

\* \* \* \* \*